US008548611B2

(12) United States Patent
Ahlstrom

(10) Patent No.: US 8,548,611 B2
(45) Date of Patent: Oct. 1, 2013

(54) FANTASY SPORTS DEPTH CHART SYSTEM AND ASSOCIATED METHODS

(76) Inventor: Joshua David Ahlstrom, Bartlett, TN (US)

( * ) Notice: Subject to any disclaimer, the term of this patent is extended or adjusted under 35 U.S.C. 154(b) by 44 days.

(21) Appl. No.: 13/398,863

(22) Filed: Feb. 17, 2012

(65) Prior Publication Data

US 2012/0214602 A1 Aug. 23, 2012

Related U.S. Application Data

(60) Provisional application No. 61/444,336, filed on Feb. 18, 2011, provisional application No. 61/444,943, filed on Feb. 21, 2011.

(51) Int. Cl.
*G06F 19/00* (2011.01)
(52) U.S. Cl.
USPC ............................................. 700/91; 463/42
(58) Field of Classification Search
USPC ............... 463/1, 7, 42; 700/91–93; 704/240
See application file for complete search history.

(56) References Cited

U.S. PATENT DOCUMENTS

| 8,099,182 | B1* | 1/2012 | Kasten ............................ 700/91 |
| 2002/0087309 | A1* | 7/2002 | Lee et al. ....................... 704/240 |
| 2008/0125228 | A1* | 5/2008 | Ware et al. ...................... 463/42 |
| 2008/0281444 | A1* | 11/2008 | Krieger et al. .................. 700/91 |
| 2010/0075729 | A1* | 3/2010 | Allen et al. ....................... 463/7 |
| 2011/0230243 | A1* | 9/2011 | Hereford ........................... 463/1 |
| 2012/0149472 | A1* | 6/2012 | Miller ............................. 463/42 |

* cited by examiner

*Primary Examiner* — Dmitry Suhol
*Assistant Examiner* — Jason Yen
(74) *Attorney, Agent, or Firm* — Mark R. Malek; G. Philip J. Zies; Zies Widerman & Malek

(57) ABSTRACT

The present invention is a data processing system for monitoring, recording and modifying information relating to fantasy sports teams and fantasy sports lineups, and making calculations, necessary for assisting fantasy owners in managing their teams, notifying them of injuries related to their teams, and in setting their lineups. In particular, the data processing system gathers data from external sources such as news, blogs, social networks sites, injury reports, and other user and system administrator configurable sources. This information is then analyzed and utilized by the system enabling it to help users more effectively manage their team. In certain embodiments the system can manage the team for the fantasy owner in their absence or under other circumstances such as lack of user activity.

27 Claims, 18 Drawing Sheets

FANTASY SPORTS DEPTH CHART SYSTEM AND ASSOCIATED METHODS

CROSS-REFERENCE TO RELATED APPLICATION

This application claims the benefit of U.S. Provisional Application No. 61/444,336, filed Feb. 18, 2011 and also claims the benefit of U.S. Provisional Application No. 61/444,943, filed Feb. 22, 2011.

FIELD OF THE INVENTION

The present invention relates generally to a fantasy sports and, more specifically, to the field of management and tracking of fantasy sports teams and depth charts associated with fantasy sports teams, and associated methods.

BACKGROUND OF THE INVENTION

It would be desirable to have a data processing system and method for monitoring, recording and modifying information relating to fantasy sports teams, fantasy sports lineups, or user defined player groups in general. It would further be desirable to have a system and method capable of making some or all calculations necessary for assisting fantasy owners in managing their teams, such as notifying fantasy owners of injuries related to their teams, notify them of other important events relating to their players, and in setting their lineups more efficiently. More specifically, it would be advantageous to have a system and method for gathering data from external sources such as news, blogs, social networks sites, injury reports, and other configurable sources and then utilizing this information along with user specified depth chart information to automatically make adjustments to the users fantasy team such as adjusting their fantasy lineup, making roster changes to their fantasy team, enabling "single click lineup setting", and making suggestions regarding possible strategy as well as generating reports, rankings, and projections for other user defined player groups.

SUMMARY OF THE INVENTION

The present invention advantageously fills the aforementioned deficiencies by providing a fantasy sports depth chart system which provides users the ability to receive varying levels of automated assistance in order to help them set and play the optimal lineup. What is considered the "optimal lineup" is dependent upon raw data collected and analyzed according to rules established, such as but not limited to system configured rules (i.e., default settings), rules configured by the user (i.e., user specific settings) or a combination of default and user specific settings.

In essence, the invention is a data processing system for monitoring, recording and modifying information relating to fantasy sports teams and fantasy sports lineups. The system, and associated computer implemented method, can make the calculations necessary for assisting fantasy owners in managing their teams. This will be useful because there are a variety of occurrences that can cause a real life sports participant to be a "late scratch" from a game. This system will also help discover these situations as close to real-time as possible, notify the user, but just as importantly be able to handle it on the user's behalf by modifying their lineup to reflect this up-to-date information in the event they are unable or unwilling to do so. The system will also be useful for fantasy leagues where certain players have given up playing, which can result in easy wins to some within the league because they are not starting an optimal lineup, which thereby skews standings. Finally, the data analysis/ranking portion of the system will be useful for users who want real-time rankings/projections within any specified group of players.

For example, the invention in certain embodiments (but not all) will notify fantasy sports owners of happenings relative to players, such as, but not limited to, news events, injury information, expert projections of the likely player performance in the game, expert projections of the likely player performance from a fantasy standpoint (i.e., fantasy/statistical projections), injuries and other news and information relating players, whether they be in the form of audio, video, news articles, blog articles, twitter posts and the like. In some embodiments (but not all) the system may collect the aforementioned happenings related to all players in a particular league, all players in the player database, all players on real teams that play on a given date (i.e. not on a team with a bye week such as, for example, NFL, or off day, such as, for example, NBA, MLB, NHL, etc.), all players eligible to play (i.e., not on suspension or injured reserve), all players on any fantasy roster in the league, for those players on the roster (i.e., the collection of players in the starting lineup and those that are a part of the broader team and generally characterized as "players on the bench," who are not in the present starting lineup but who are on the fantasy team) of a particular fantasy team, or for those players in the starting lineup (i.e., only those players presently in, or scheduled to be in, the starting lineup; hereinafter sometimes referred to simply as "lineup").

In certain embodiments (but not all) the system may dynamically take all, or a portion, of the information collected into account in automatically setting or suggesting an optimal lineup for maximum performance. In particular, the data processing system gathers data from external sources such as news, blogs, social networks sites, injury reports, league data and announcements, team data and announcements, press conferences and other sources. In certain embodiments (but not all) this information may be analyzed using the rules established to help users more effectively build and manage their team.

In certain embodiments (but not all) the system may retrieve information based on rules established and may automatically utilize the information to automatically compute a recommended depth chart, which can, in some instances, be provided to the fantasy owner to be used, or not, at their discretion. In certain other embodiments (but not all) the system may automatically compute the optimal lineup and start those players most likely to lead to maximum points scored for the fantasy owner. Automatic settings can do as much or as little as the fantasy owner desires. For example, the automatic settings can be turned on standby and only activated within a user or system predetermined time interval prior to the start of the next game any member of the lineup will be eligible to play in, or an interval of time prior to the start of the next game that any member of the roster will be eligible to play in, or an interval of time prior to the start of the next game that any member of the opposing team is eligible to play in. As should be readily understood, the automatic take over controls are susceptible to a variety of options that can be default settings or rules can be specifically created by the fantasy owner for myriad of contingencies.

In certain embodiments (but not all), for each fantasy team the system may seek to retrieve the team's depth chart, if the fantasy owner has elected to create their own custom depth chart. In other embodiments (but not all) the system may automatically calculate an optimal depth chart, which may or may not take into consideration matters such as bye weeks, injuries, suspensions and the like.

In certain embodiments (but not all) for each position the system may determine which players rank highest for a period of time (i.e., a day, a week, minutes or any time period) thereby creating an automated depth chart. In fact, the system can run continuously updating player ranks on a continuing basis as new information is collected and analyzed. Fantasy owners can, in certain embodiments, set their preferences to automatically adopt the automated depth chart, thereby resulting in the highest rated players automatically starting. Owners can, of course, override recommendations as well through electing user defined system settings or manually adjusting values to their liking. In fact, the fantasy owner can set their settings to fully automatic and then at any time prior to the fantasy system locking lineups (typically when a game a player is participating in has started) override the automatic setting. In this embodiment of the system the fantasy owner may retain the benefit of having the knowledge that if they do not have time to engage manually the system will automatically select the optimal lineup. Likewise, the fantasy owner has the ability to override the system even if it is set to automatic, thereby continuing to allow the fantasy owner to be in control if time and desire is present.

One particularly unique aspect of the system is that in certain embodiments (but not all) there is natural language shifting of information to create the depth chart ranking. Essentially, a list of keywords is searched and associated with values (i.e., +/− or 0 through 10, any ranking system will suffice). The system, in some embodiments (but not all), includes an incidence count relating to player, name, keyword, proximity, etc., and may also allow for natural language processing (NLP) libraries to be utilized. Usage of NLP would assist in useful data extraction and reduce "false positives" in which the system might believe a story to be about Player 1 getting hurt and being injured when in fact the story is really about Player 2, for example. Player 1 and Player 2, for example, might both be mentioned in the same news article, but there may be characteristics that helps the system to key in on the fact that Player 2, for example, is the injured player and that Player 1 is only mentioned in passing, for example. Thus, how close the player name appears in proximity to the keyword searched may be considered.

This keyword-proximity feature can be fully customizable by the fantasy owner, or system defaults can be employed in part or in whole. For example, in a particular embodiment of the system, the default setting may highly value the word "injured" provided it appears within 4 words of the player's name. The fantasy owner may wish to change that setting and most highly value incidents of the word "injured" that are within 2 words of the player's name.

Among other things, it is an object of the present invention to provide a fantasy sports depth chart system that does not suffer from any of the problems or deficiencies associated with prior solutions.

DETAILED DESCRIPTION OF THE INVENTION

The present invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein. Instead, these embodiments are provided by way of illustration only and so that this disclosure will be thorough, complete and will fully convey the full scope of the invention to those skilled in the art.

The invention is directed to a system and a method to be used in connection with the playing of fantasy sports and, more specifically, a fantasy depth chart system and management assistant for use when playing fantasy sports. The system and method according to the present invention is a computerized process for assisting users/agents with managing their fantasy sports teams and lineups.

Figure 1:
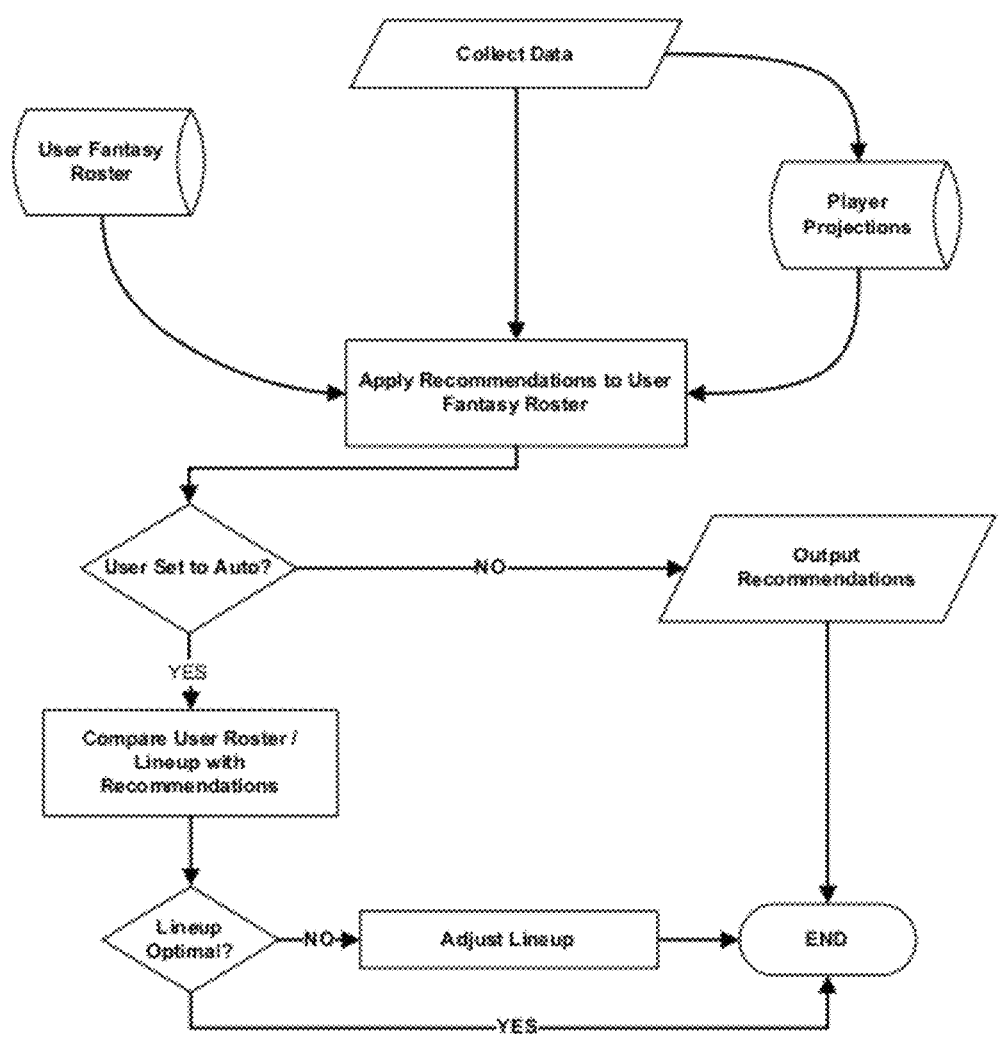
FIGS. 1, 1A and 1B are flow charts depicting an implementation of the fantasy depth chart system according to an embodiment of the present invention.

Referring to FIG. 1, data will be collected by retrieving information from a variety of sources relating to real life sports participants. It should be noted that the sports participants referenced here and throughout includes professional athletes and amateur athletes, but need not be limited to only athletes. Fantasy sports should be thought of throughout this disclosure as fantasy competitions (some of which relate to sports, but others could certainly be non-sport related while still be fantasy competitions). This being the case, the participants are any members of real life events whose performance in some capacity can have a fantasy scoring related affect in a fantasy game. One could imagine a game in which the scoring does not always rest entirely on the athletes (coaches could receive fantasy points for any points scored on a possession following a time out or for missed fieldgoals after a strategic "icing of the kicker", onside kick recoveries, wins/losses, and so on) and fantasy games that do not even involve athletes can also be easily foreseen and serviced by the system described here. In this particular implementation, the data collected is illustrated to be player projections from experts who predict the likely output of participants (also called players even though in certain embodiments the participants may not be athletes or playing sports, but may be contestants, such as American Idol contestants and the like), which is then stored in the system.

The information collected does not need to be limited to player projections, but for illustration purposes player projections are shown in the flow char and are not intended to be limiting. Upon collecting the player projections from a variety of sources the user's fantasy roster is retrieved and the player projections may be applied to the fantasy roster in order to give the fantasy owner and/or system useful information that can be used to set an optimal fantasy lineup. In this embodiment, if the fantasy owner has set his/her settings to "auto" the system will compare either or both the fantasy owner's roster or lineup with the recommendations created as a result of the retrieved information. If the lineup is optimal, then no changes are made. If the lineup is not optimal, then the system automatically adjusts the lineup and submits the lineup. In the event the fantasy owner does not select the auto setting, the recommendations created are output in the form of recommendations for consideration, as desired by the fantasy owner.

"Optimal," as used herein, relates to a lineup that passes all the rules/tests that are in affect for the user utilizing the system. Rules and/or tests that are used to determine whether or not a lineup is optimal may, for example, be stored on a database, and may be user defined rules/tests, or rules/tests that are set by, for example, a system administrator. Optimal may, for example, be defined as "all spots on a fantasy roster that can be filled are filled." Also for example, optimal may be defined as "all spots on a fantasy roster are filled with the best possible player" or it might be "all spots on a fantasy roster are filled that are possible, but with the worst possible players," as may be desired in certain variations of the present invention. This last situation where optimal is defined by the worst players, could come up in a keeper-league in which a team's draft positions are based on where they finished the season. By their league rules, all members might be required to set a lineup, but losing teams may still want to lose games to get a better pick the following year while still following league rules of the league. This, of course, assumes that the team which finishes with the worst record obtains the first pick in the coming draft. Thus, what is "optimal" may well be in the eye of the beholder and may be customizable by the fantasy owner at the discretion of the overall league settings. Therefore, an infinite array of what is "optimal" and what may be a allowed as "optimal" exists as a function of fantasy owner desires and league configurable settings.

Figure 1A:
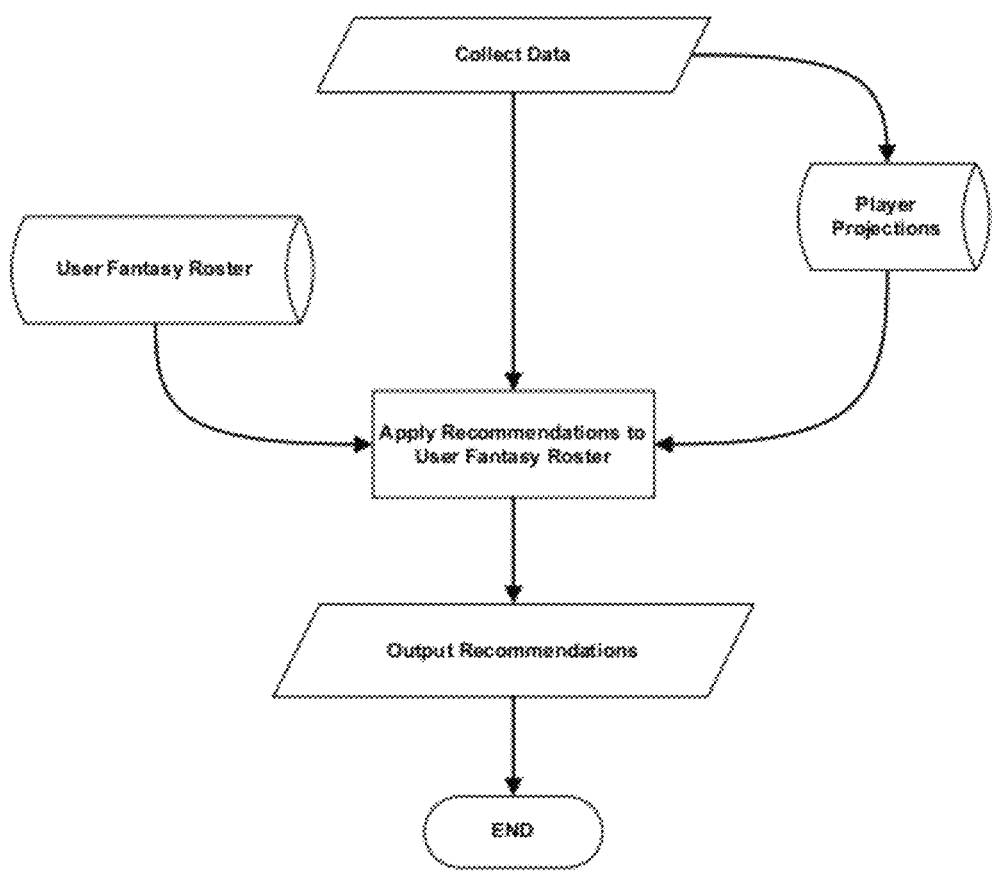
Figure 1B:
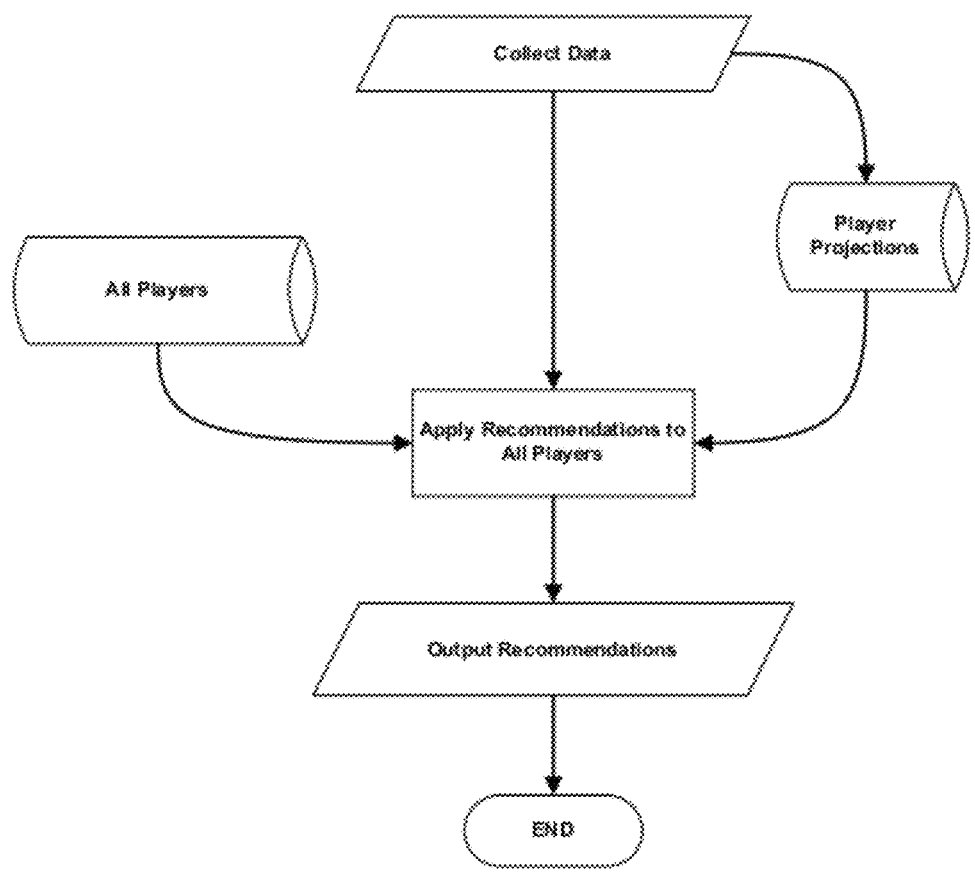

FIG. 1A and FIG. 1B were intended to capture the situation where information is collected and then made available to the fantasy owner (user) through output reports or through a search interface. They could be available just for the fantasy roster or for all players, as per the daily draft implementation.

Figure 2:
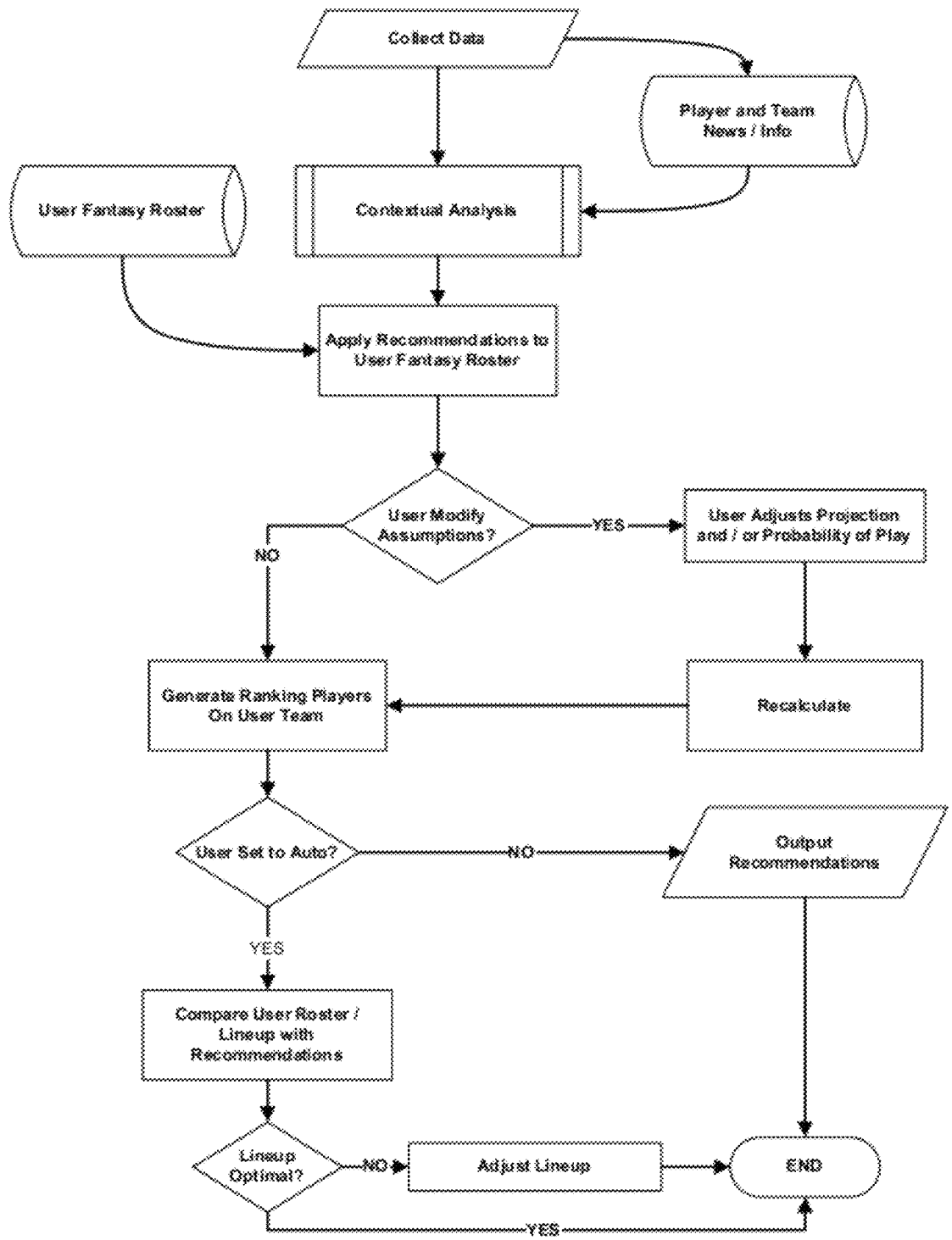
FIGS. 2, 2A and 2B are flow charts depicting another implementation of the fantasy depth chart system according to an embodiment of the present invention.

Referring to FIG. 2, this implementation of the present invention advantageously retrieves a plethora of data of different sorts, including, but not limited to, news articles, blog articles, rumors (as generally reported in many sports reports), twitter updates, team announcements, league announcements and any other information that relates the sports participant. The information may then be passed through a contextual analysis routine where settings filter the information so it can be used to create unique recommendations not solely based on expert projections.

As will be discussed later with respect to FIG. 6, this synthesis of information can advantageously create a system defined projection and a probability of play for each player being considered on a fantasy roster and, more importantly, for each player that is eligible for an owner, for example, to use on their fantasy roster. The fantasy owner may modify those system created projections and alter the probability of play as desired to customize a recommendation based on their own beliefs and information, thereby allowing the fantasy owner to act as a coach would generally act by accepting information and weighing the information differently to arrive at unique determinations. In this embodiment of the present invention, the recommendations formed through the efforts of the system, which may be modified by fantasy owner input, seek to generate a player ranking based on position played. Again, if the fantasy owner has set the system to auto the system can take over and optimize the lineup.

Figure 2A:
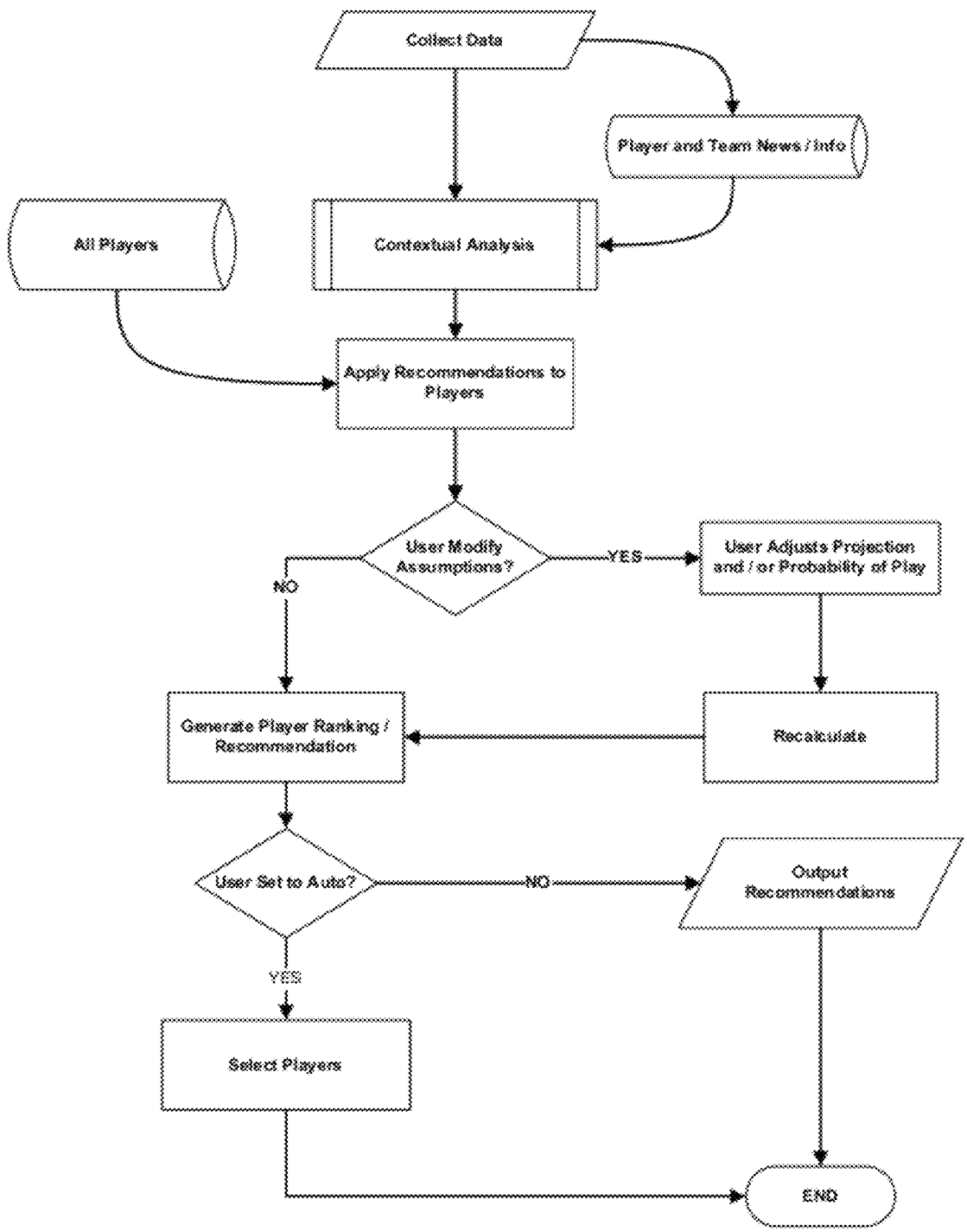

FIG. 2A is also intended for the daily draft scenario. Here, unlike in FIGS. 1A and 1B, the contextual analysis routine is employed to sift through the information collected and apply the system specific recommendations created. This version is similar to FIG. 2, but here, if the fantasy owner has their system set to auto, the players that will maximize the lineup are selected. An example of this version would be for fantasy play where owners need to fill a roster of players without going over an identified salary cap. Each player may be assigned a salary cap value and all slots must be filled without going over the pre-set salary cap.

Figure 2B:
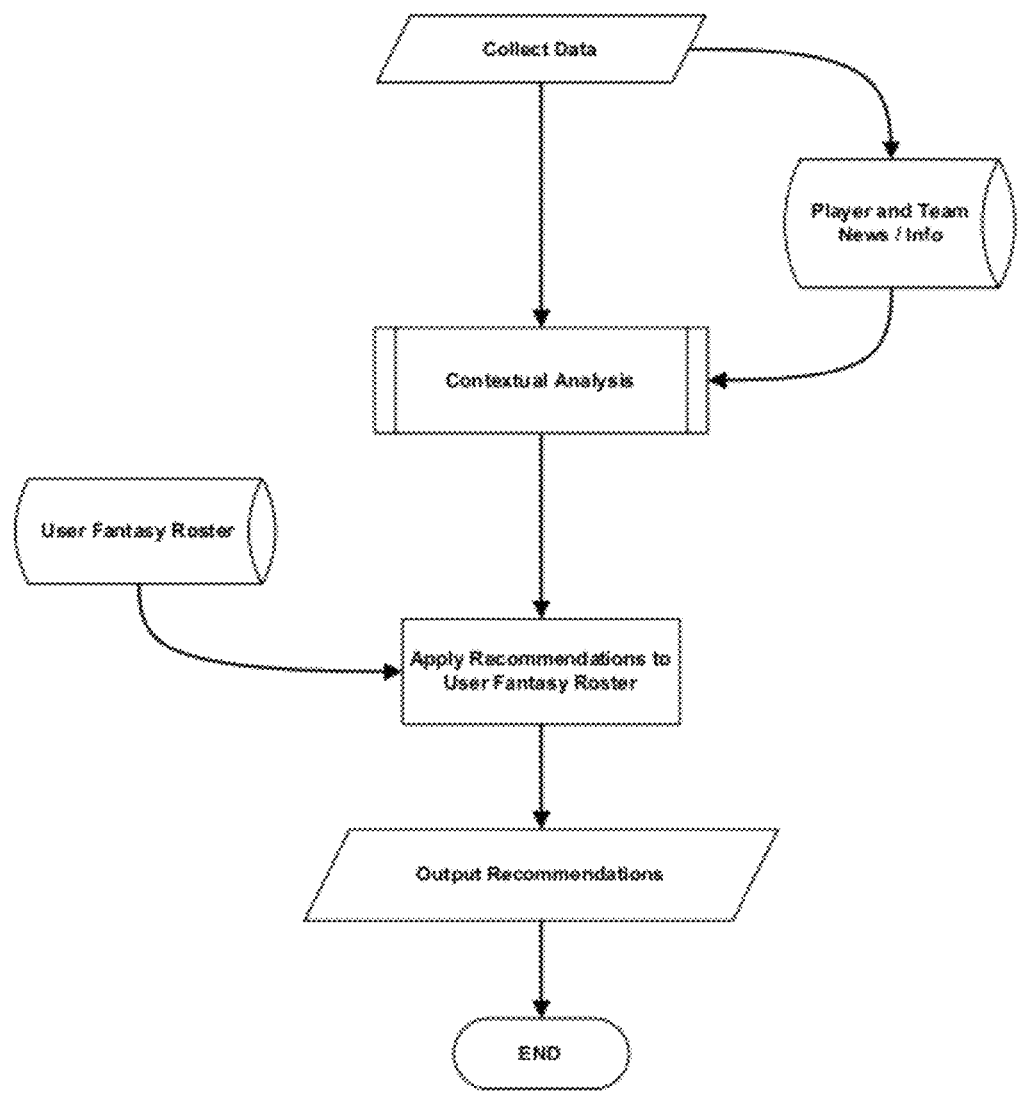

FIG. 2B is a more basic version whereby the contextual analysis routine is employed. The data collected is run through the contextual analysis routine to generate a system specific recommendation. This system specific recommendation may be applied to the fantasy roster and then output to the fantasy owner either in the form of a report or made searchable.

Figure 3:
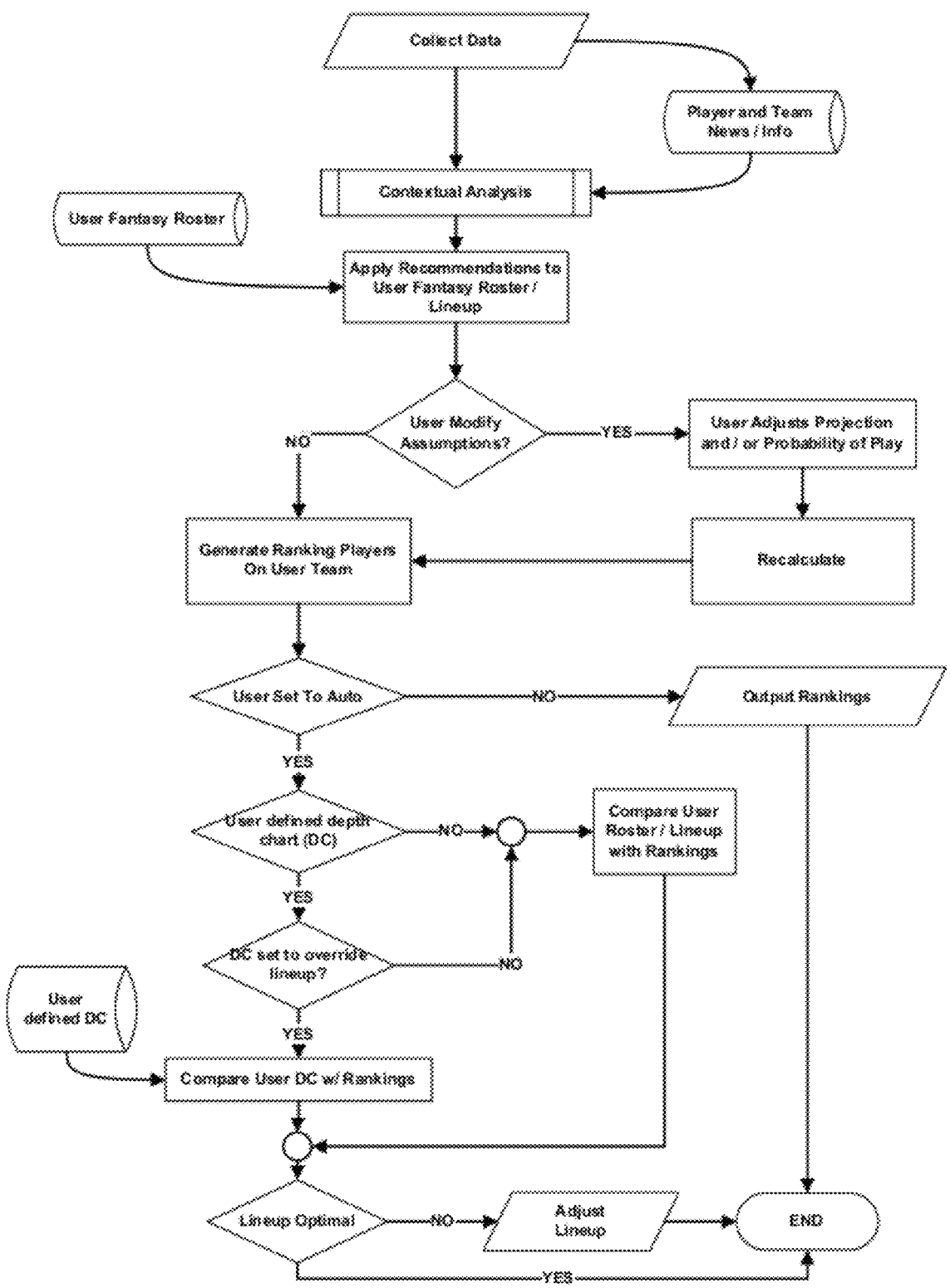
FIGS. 3, 3A and 3B are flow charts depicting yet another implementation of the fantasy depth chart system according to an embodiment of the present invention.

FIG. 3 shows an embodiment similar to that discussed in FIG. 2, but in this embodiment there is also an optional user defined depth chart. If the fantasy owner has set a custom depth chart for one or more positions that depth chart ranking assigned by the fantasy owner can be taken into consideration. The optional user depth chart can merely be for informational purposes or to record thoughts and not set to have any primary affect in determining the optimal lineup in the auto setting. The optional user defined depth chart can be set to override the current lineup in place, in which case comparisons with the player rankings would be made against the user defined depth chart rather than against the roster or lineup. In either situation the ultimate desire is to analyze the rankings against either the user created depth chart, the full roster or the lineup in order to determine the optimal lineup within the customized settings selected by the fantasy owner.

Figure 3A:
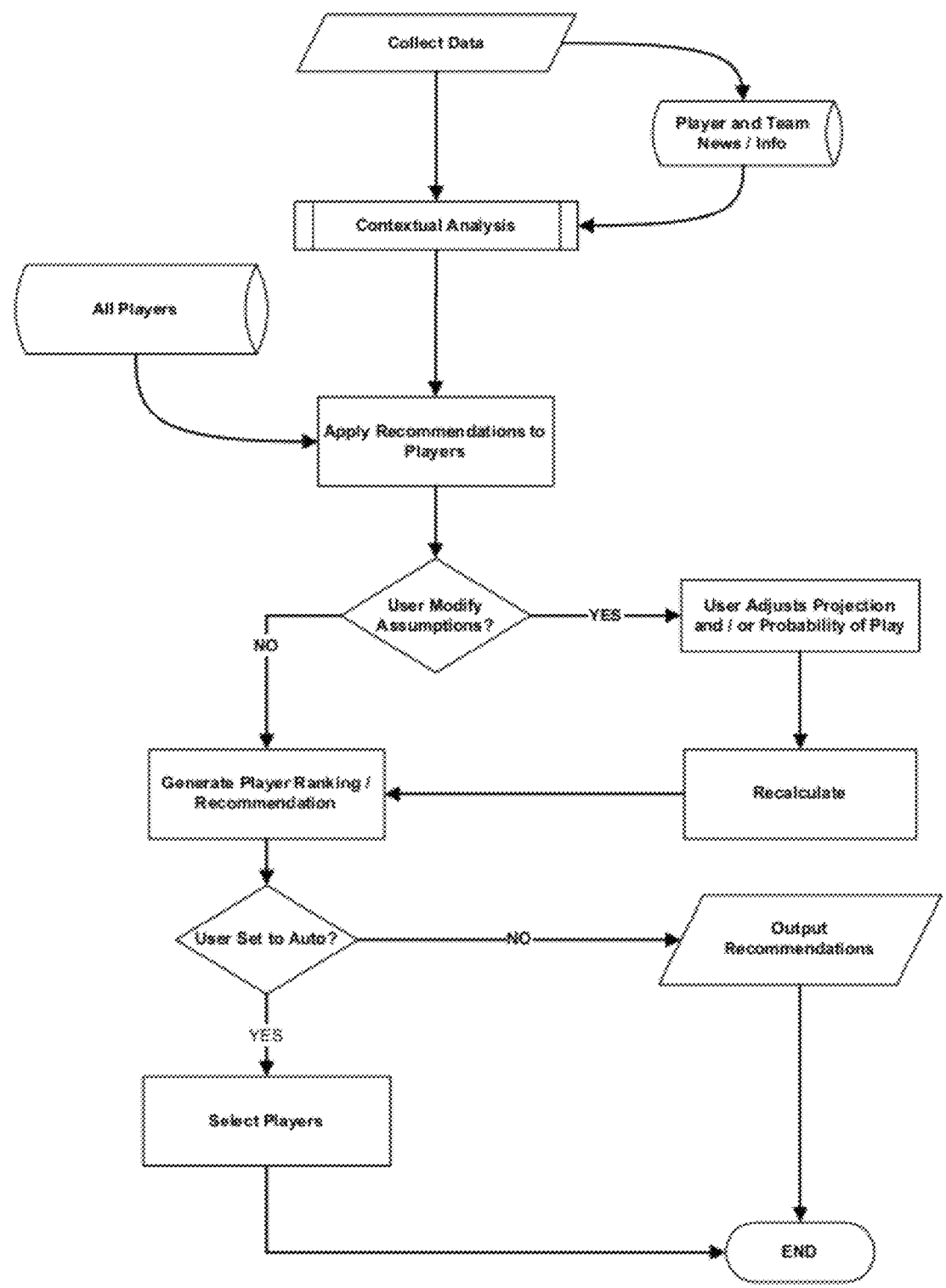
Figure 3B:
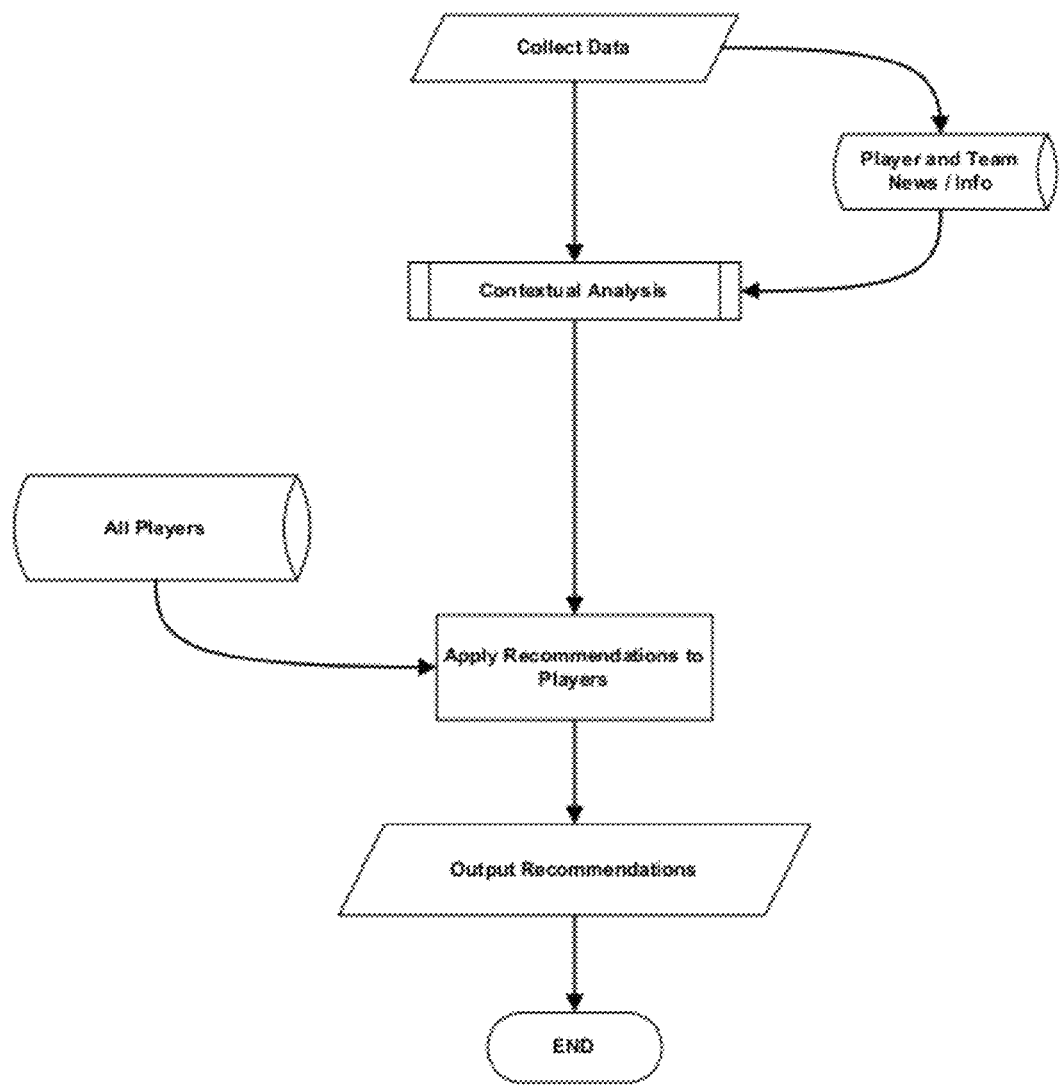

FIG. 3A is similar to the implementation shown in FIG. 2A, but here the fantasy owner is given the ability to adjust assumptions that were generated in the contextual analysis routine and then have the system specific recommendations recalculated based on the manipulation of inputs as defined by the fantasy owner. FIG. 3B is similar to the implementation shown in FIG. 2B, but here the system specific recommendation is applied to all players and then output to the fantasy owner either in the form of a report or made searchable.

Figure 4:
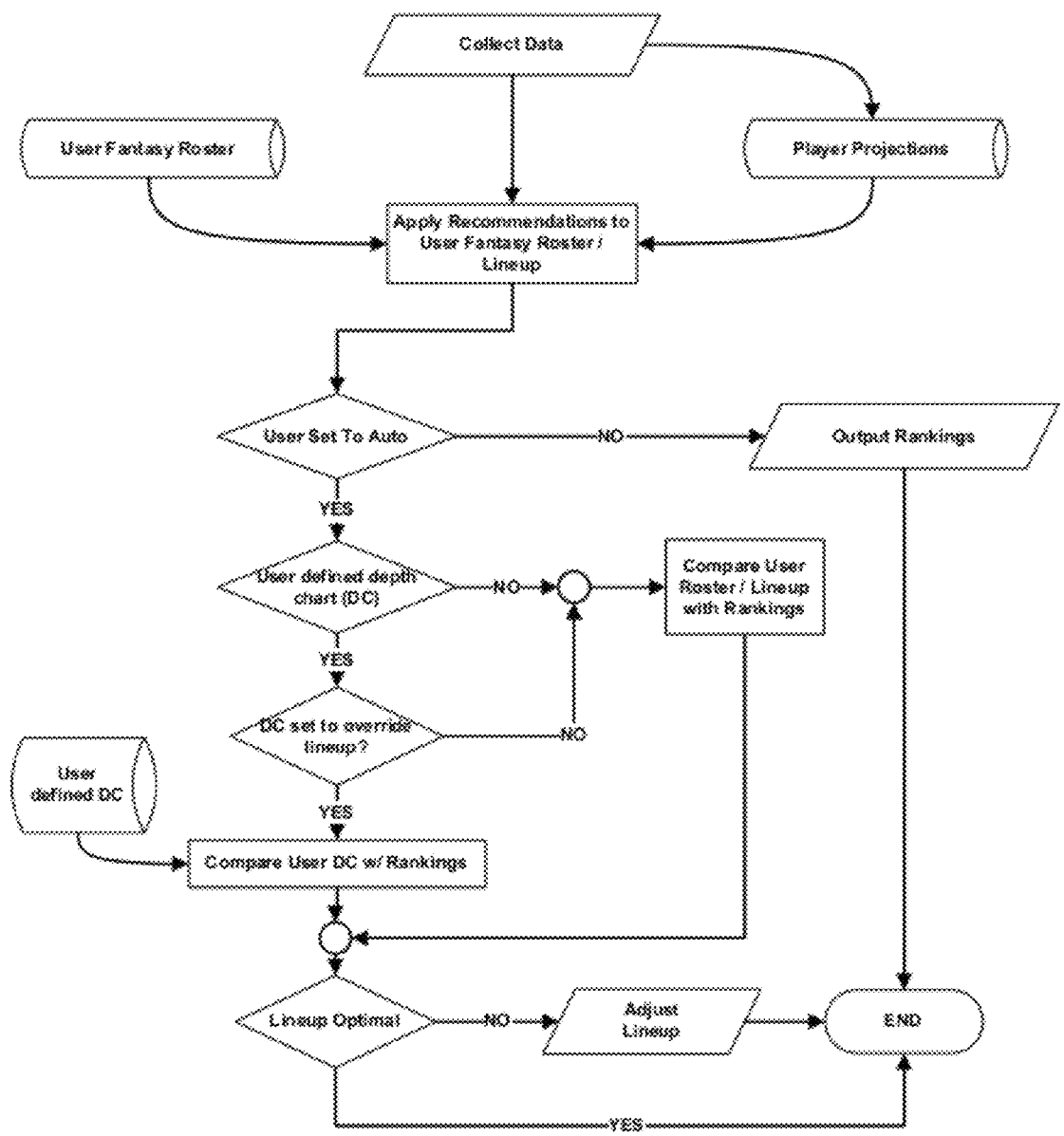
FIG. 4 is a flow chart depicting still another implementation of the fantasy depth chart system according to an embodiment of the present invention.

FIG. 4 demonstrates another implementation that could be considered to fall between the implementation shown in FIG. 1 and the implementation shown in FIG. 2. Here there is no contextualized data that is being considered, but the fantasy owner does have the option to create a user defined depth chart that may or may not be ultimately considered during an auto lineup adjust phase.

Figure 5:
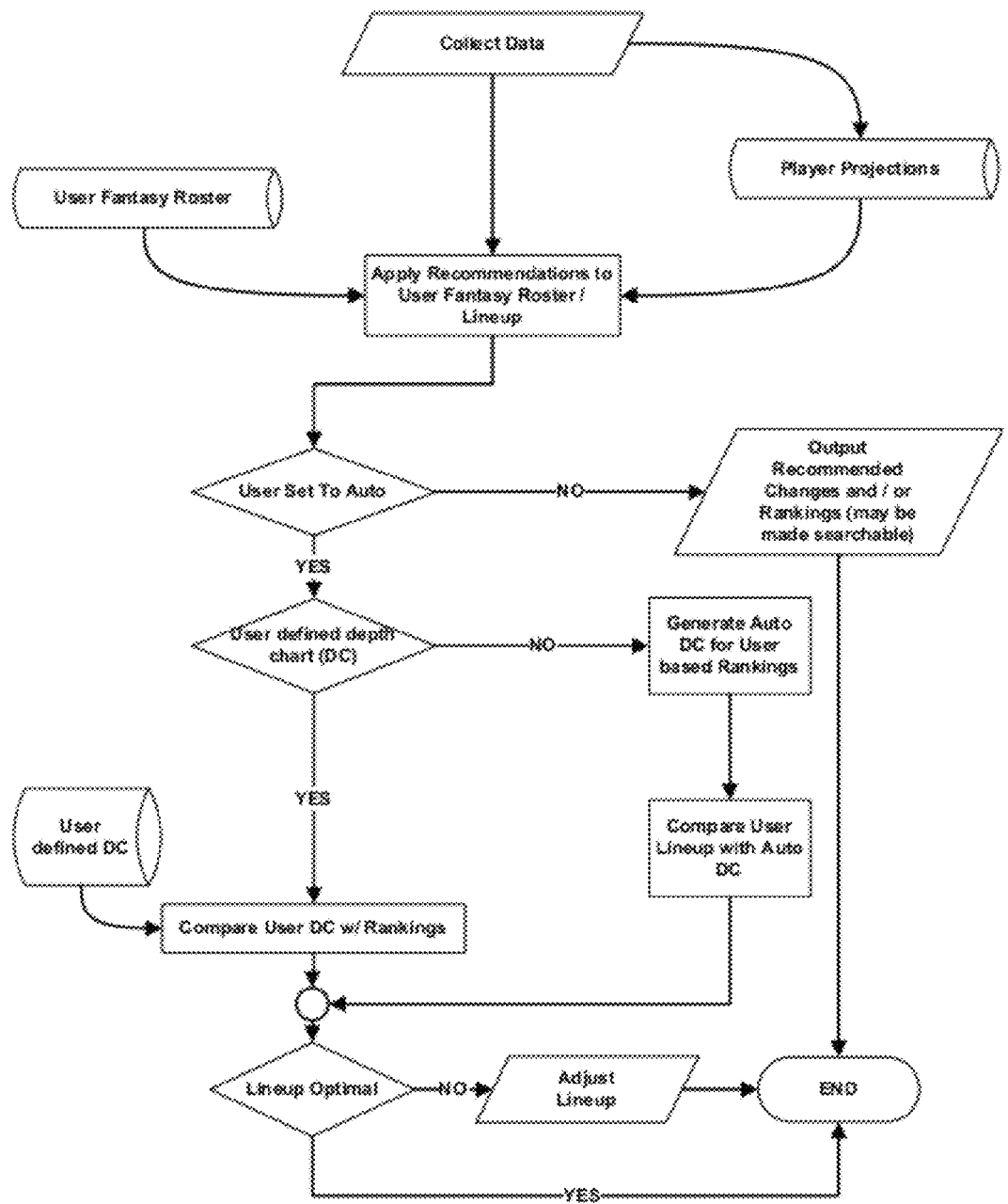
FIG. 5 is a flow chart depicting another implementation of the fantasy depth chart system according to an embodiment of the present invention.

FIG. 5 illustrates another implementation that is similar to that illustrated in FIG. 4, but here if the fantasy owner does have a depth chart set, it will not be viewed as potentially superfluous with respect to setting an optimal lineup when in auto mode. It should also be noted that here, and in FIG. 9, the output of recommendations (or suggestions) may be identified as possibly being satisfied by making the output searchable. This is intended to convey and cover the output of lists, tables or charts, for example, as well as making the recommendations/suggestions accessible to the fantasy owner through searching the stored data, thus making the recommendations/suggestions accessible through pulling information from storage rather than by pushing the information to the fantasy owner in the form of a reporting of some kind by various means. Thus, here, and elsewhere, when outputted information is mentioned, it is intended to, and does, in fact, cover both the pushing (via display or report) as well as the pulling (through search or customizable fetch of a designed subset of players).

Figure 6:
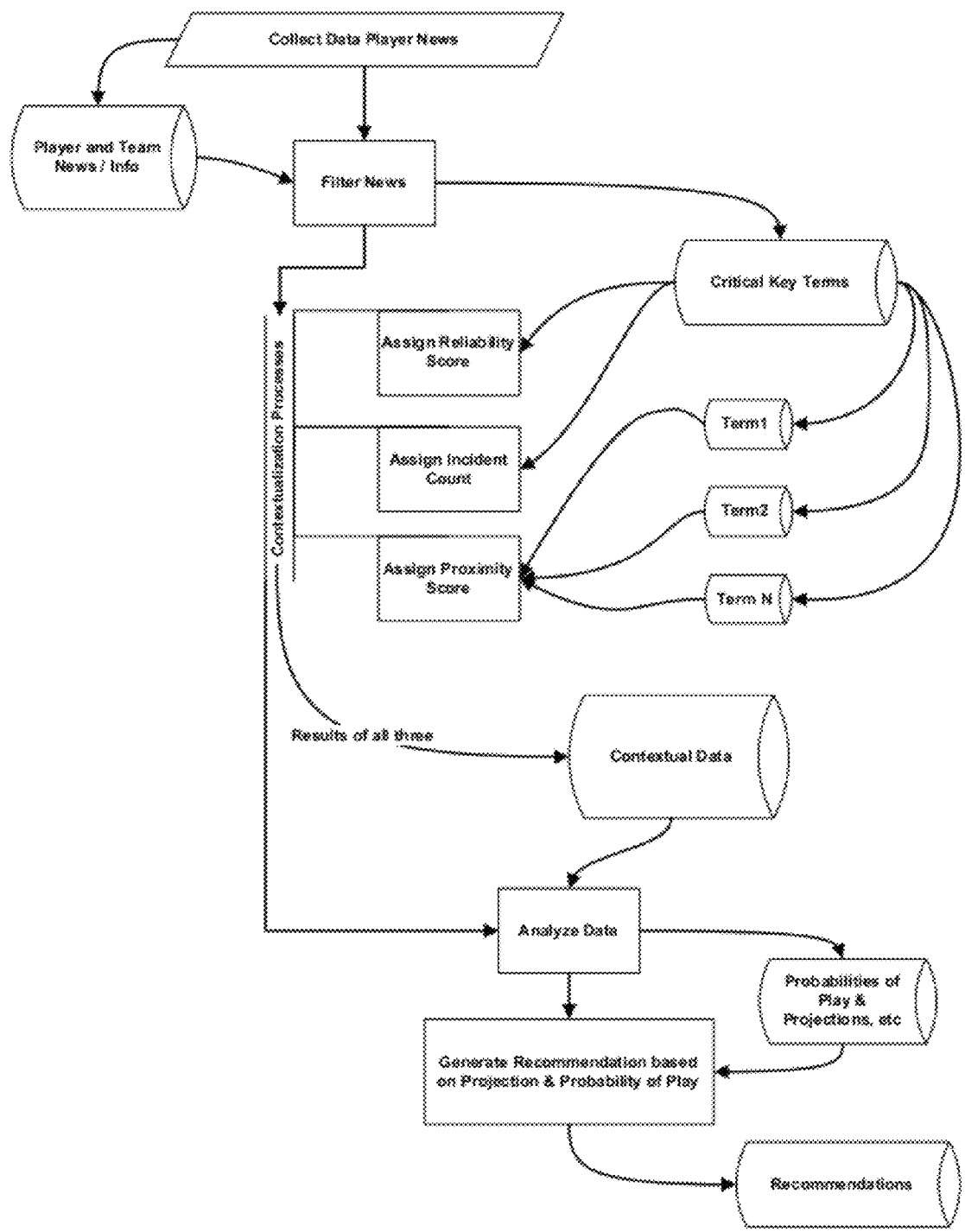
FIG. 6 is a flow chart depicting the contextual analysis process referred to in FIG. 2 and FIG. 3 of the fantasy depth chart system according to embodiments of the present invention.

FIG. 6 illustrates the aforementioned contextual analysis process. Here player news, information, rumors and projections of any and all varieties can be collected and stored. This information, collectively referred to as "news," may be filtered to identify critical key terms. These critical key terms can manifest themselves through system defined pre-set configurations, or can be user defined or supplemented in conjunction with system pre-set configurations. Any number of terms can be accounted for. In addition to identifying the number of times any particular key term has been located, a reliability score can optionally be applied, perhaps giving more weight to sources such as ESPN or Sports Illustrated over lesser known, smaller operations. A proximity score can also be arrived at which, through weighted rules, (either system defined, user defined or a combination of the both) may be configured to give preference to those key term combinations that appear in close proximity to one another based upon a reality that, for example, the word "injured" appearing several paragraphs away from the player name likely does not mean that the particular player is injured. The term "injured," however, appearing within a few words of the player name, on the other hand, may suggest that the player is injured, which can be important information to consider when setting a starting lineup. The incident count, reliability score and proximity score, among other information that can be deciphered from the located key terms is considered to be contextual data. This contextual data can be analyzed by the system to generate a recommendation that is based on the projected scoring output of the player, as well as the probability that the player will actually play.

With respect to the contextual analysis shown in FIG. 6, the system allows for natural language processing and other text analysis/knowledge extraction methodologies to be utilized to further enhance the analysis of retrieved news/data. Furthermore, as also illustrated in FIG. 6, once the contextual data is analyzed, it may be stored. This will, in some embodiments, allow the fantasy owner to, at a later time, modify the underlying assumptions so as to have customized the analyzed contextual data used to generate recommendations.

Figure 7:
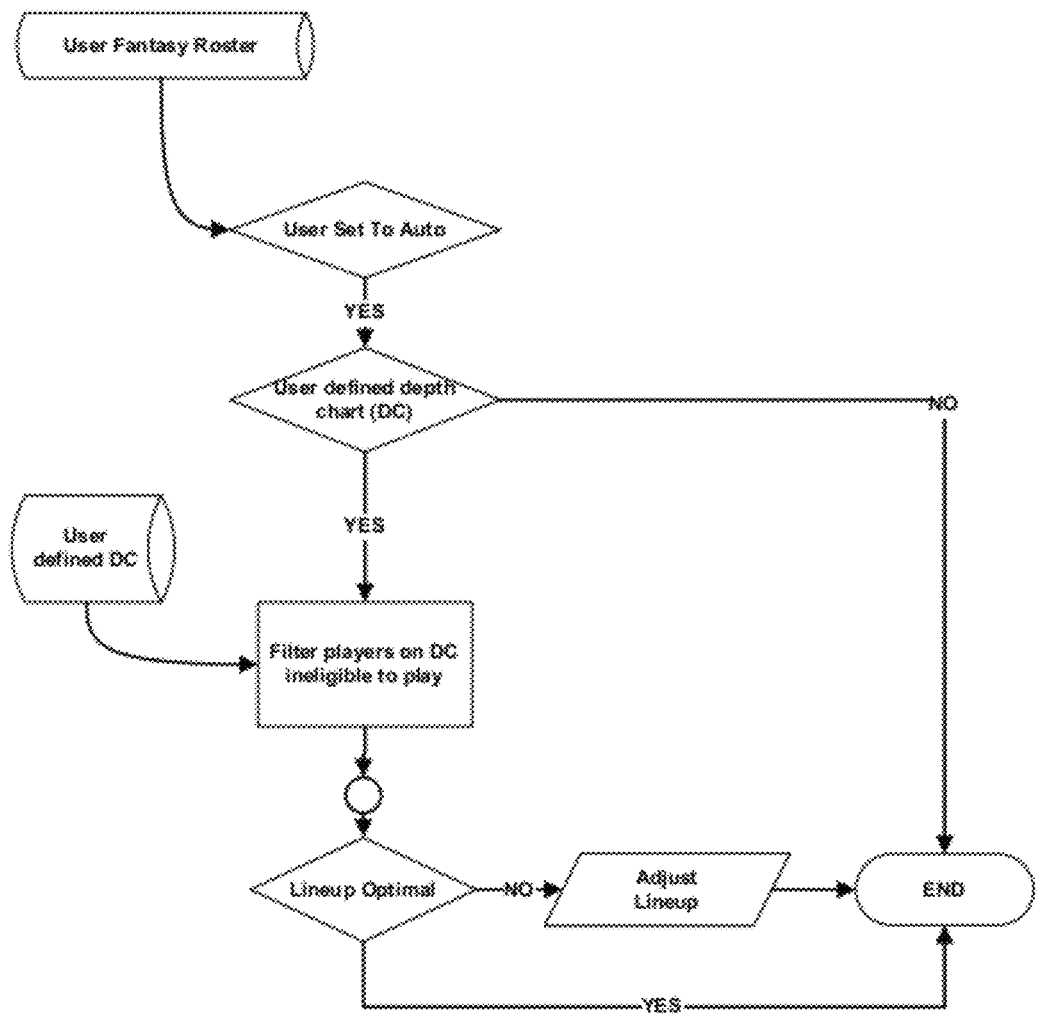
FIG. 7 is a flow chart depicting another implementation of the fantasy depth chart system according to an embodiment of the present invention.

FIG. 7 shows another variation of embodiments of the present invention wherein the user is provided with the ability to select the optimal lineup that is based solely on the user defined depth chart, should one exist. As in any of the embodiments, the optional user defined depth chart can be modified by the fantasy owner from time to time, or the fantasy owner can set up their depth chart one time, and from then on can have their lineup automatically populated either using information derived from the user defined depth chart. In this and other embodiments the depth chart can be filtered to remove any players that are ineligible to participate, whether as a result of a bye week, off day, suspension, injured reserve status, or other limiting factors. In this and other embodiments the user defined depth chart can also filter player who are not on the active roster when such rosters are announced prior to game-time. Here, with respect to the implementation specifically disclosed in FIG. 7, the user defined depth chart alone may be considered after filtering ineligible players when the fantasy owner has selected auto mode.

More specifically, FIG. 7 is intended to illustrate a situation where the fantasy owner has set his/her control module to auto and has created a depth chart by one means or another (i.e., manually or through the use of system facilitation). In this embodiment, the user defined depth chart is filtered to remove any players that are ineligible to play for whatever reason (i.e., bye week, no game that week/day, suspension, injured reserve, etc.). If the resulting lineup is optimal based on projections then the lineup may be submitted. If, however, the resulting lineup is not optimal, the lineup may be adjusted to play the optimal lineup. For example, and in no way meant to be limiting, if the fantasy owner were playing in a two quarterback league they might set his/her depth chart as follows: (1) Peyton Manning; (2) Tony Romo; (3) Eli Manning; and (4) Kyle Orton. If Peyton Manning was ineligible then the two starters would be slated to be Tony Romo and Eli Manning. In this implementation the system would ask whether those two starters are optimal. If, for example, in a particular week Kyle Orton might be projected to score more than either Tony Romo or Eli Manning, then he could be substituted ahead regardless less of the fact that the originally created user depth chart would suggest otherwise. The fantasy owner could rely on this adjust lineup feature under a variety of circumstances, such as but not limited to only having the projections trump the previously defined depth chart in the event that the projection for the player would not start (i.e., Kyle Orton) is a certain percentage higher than one of the starters dictated by the user defined depth chart.

Figure 8:
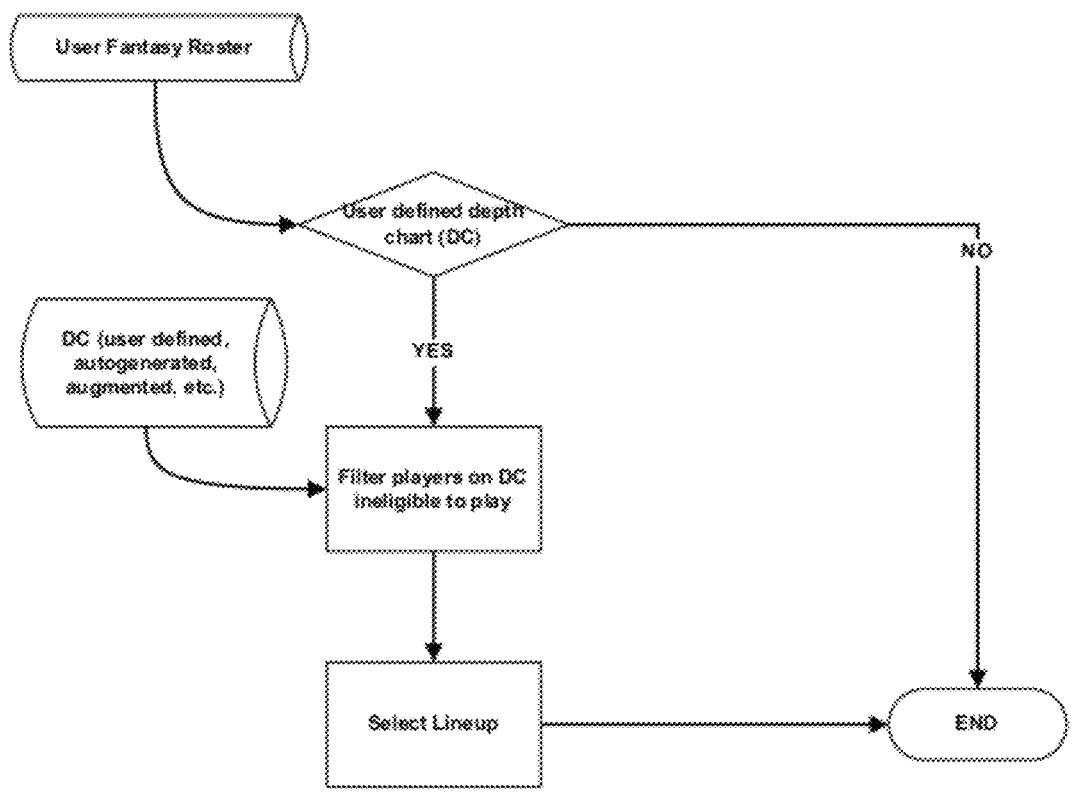
FIG. 8 is a flow chart depicting yet another implementation of the fantasy depth chart system according to an embodiment of the present invention.

FIG. 8 illustrates an implementation similar to what is shown in FIG. 4, but here the user defined depth chart is filtered for ineligible players and then the lineup is set without asking whether the lineup is optimal. In this implementation once the ineligible players are removed the lineup is set using the pre-defined depth chart preferences. For example, and not meant to be limiting in any way, if a fantasy owner can play two running backs and has 4 running backs on his roster the fantasy owner might set his/her depth chart as follows: (1) Adrian Peterson; (2) Deangelo Williams; (3) Felix Jones; and (4) Brandon Jacobs. If both Adrian Peterson and Deangelo Williams are eligible to play they would be the two starters. If one were not eligible to play, perhaps Adrian Peterson because of a bye week, Felix Jones would become a starter along Deangelo Williams. If both Adrian Peterson and Deangelo Williams were ineligible, perhaps because of a bye week for Peterson and Williams being placed on injured reserve, then the two starters would be Felix Jones and Brandon Jacobs.

The system and associated invention described herein have been described in terms of fantasy sports. That is intended to be illustrative and not limiting. The described invention and the various embodiments and alternative can be deployed for any fantasy game or competition. There could be fantasy American idol, fantasy stacker broker, fantasy corporation or any other type of endeavor where there exists a participant pool. In fact, the described invention and its various embodiments and options can be deployed to facilitate the creation of a fantasy team comprised of team members that collects wins or points based on quantifiable comparison between/among one or more teams. The concepts of how the game would be played are similar and the utility of the described invention would be as well.

Figure 9:
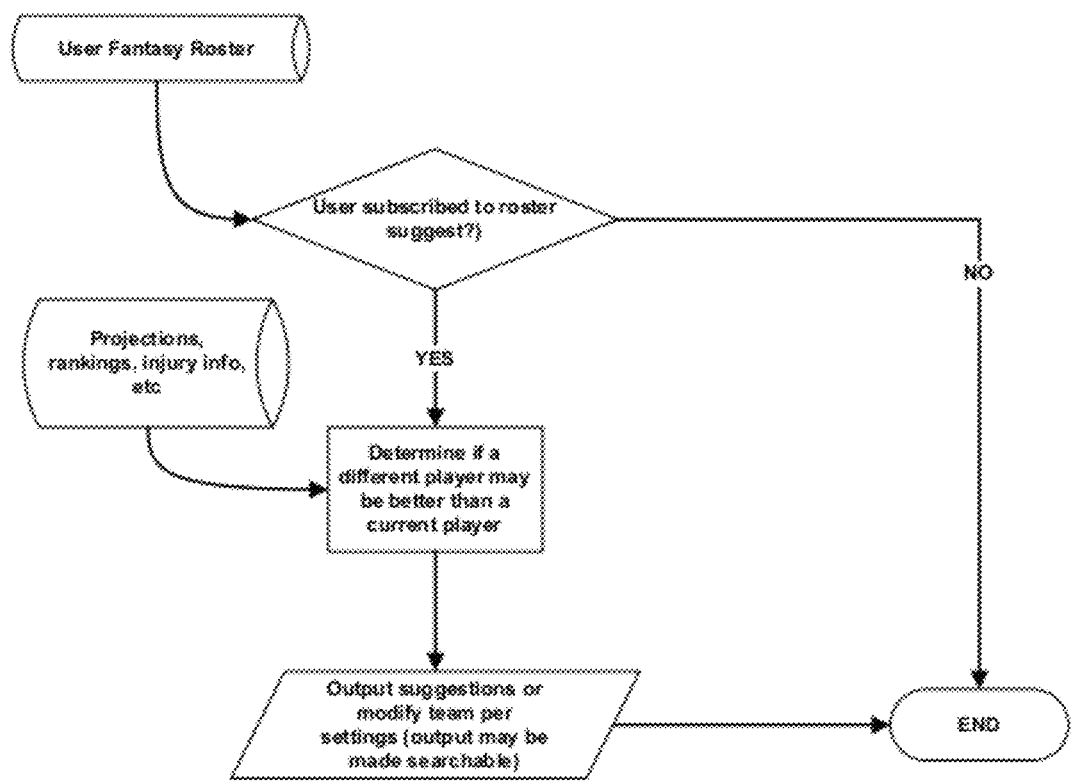
FIG. 9 is a flow chart depicting a roster suggestion module of the fantasy depth chart system according to an embodiment of the present invention.

Now referring to FIG. 9, shown is a roster suggestion module. The functionality works much like the lineup setting functionality. Rosters are retrieved from the provider (or entered by the user). As new data, such as but not limited to news, injury information and the like, is added to the system the roster of each team utilizing this functionality will be reviewed. If, for example, a member of the fantasy team is injured and analysis reveals that the player is likely "out for the season" then the system will automatically try to find the best available player(s) to replace the injured player. It will then notify the user of the suggestion and make the information available via user interfaces, either in the form of providing a report, list, table or some other kind of display or made searchable. In addition, if the system has been given the autonomy to do so then it can automatically make the roster move on behalf of the user.

Another way the roster suggestion functionality will be applicable is that it can regularly find "weak spots" in a fantasy team and suggest changes. Fantasy managers are notoriously confident in their own abilities and will often not have the time to seek about better players unless a player is injured. The roster suggestion module can identify weak members (via statistical analysis and/or projected statists comparisons) of a fantasy team, notify the manager that opportunities exist to improve the fantasy roster, and suggesting exactly how the manager modify the roster to obtain maximum production. This information can be made available through various display techniques or made searchable. In some embodiments the system can be given the autonomy to make modifications automatically, thereby automatically making the roster move on behalf of the user.

Figure 10:
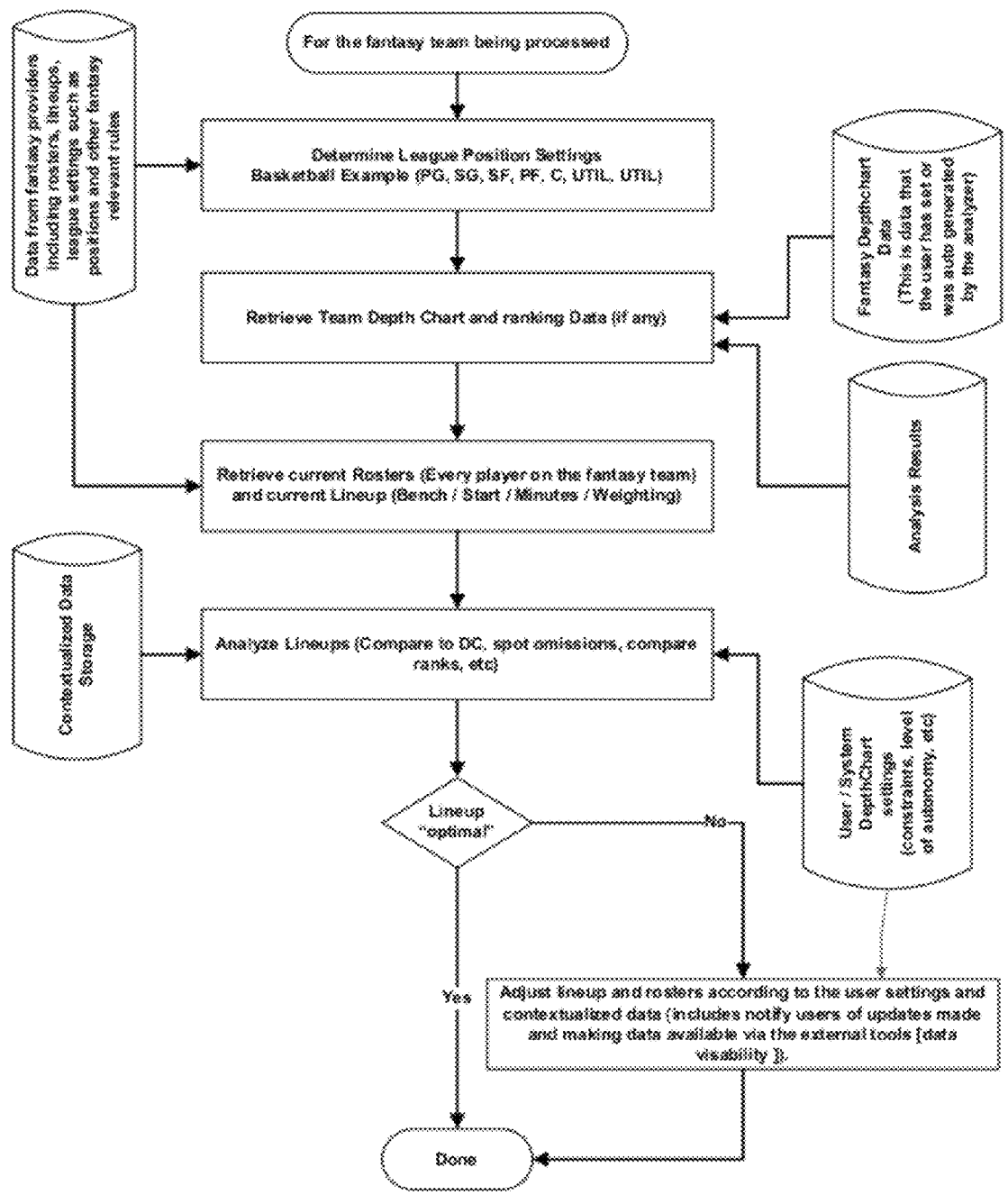
FIG. 10 is a flow chart depicting an overview of the depth chart manager according to the present invention.

Referring now to FIG. 10, an overview of a depth chart manager according to the present invention is now described in greater detail. The function of the depth chart manager is to automate certain data crunching and to set lineups for, adjust the rosters of, and provide general assistance to fantasy managers relating to their duties involving management of their fantasy sports teams. As indicated above, the depth chart manager receives input from several different locations and uses that input to manage the depth chart of a fantasy sports team.

Initially, the depth chart manager determines league position settings. For example, depending on the sport, various leagues may have various settings depending on the positions. Data is received from fantasy providers which may include rosters, lineups, league settings (such as positions), and other fantasy relevant rules. Fantasy depth chart data, which may be defined as data that the user has set or was automatically generated by the analyzer, is then received. This data may, for example, be retrieved from outside sources, or may be stored on an internal database. Result of an analysis of the fantasy depth chart data is also received, and the team depth chart and ranking data may further be retrieved.

Thereafter, the current rosters and the current lineup may be retrieved from a database, along with additional data from fantasy providers. The lineups may then be analyzed, and data that may be received from a database containing contextualized data may also be used to analyze those lineups. As the lineups are analyzed, depth chart settings are also analyzed. Thereafter, it is determined if the lineup is optimal. If the lineup is not optimal, then the lineup is adjusted, along with the rosters, according to the user settings and, in some embodiments, the contextualized data (which will be discussed in greater detail below). This may include a notification to be sent to the user of the updates made to the lineup, as well as providing the data via external tools. If, however, the lineup is optimal, then use of the depth chart manager is considered complete at that point. Those skilled in the art will appreciate, however, that the depth chart manager may continuously check for whether or not the lineup is optimal, i.e., it is to be understood that the depth chart manager and the system according to the present invention, is a continuous analysis system.

Figure 11:
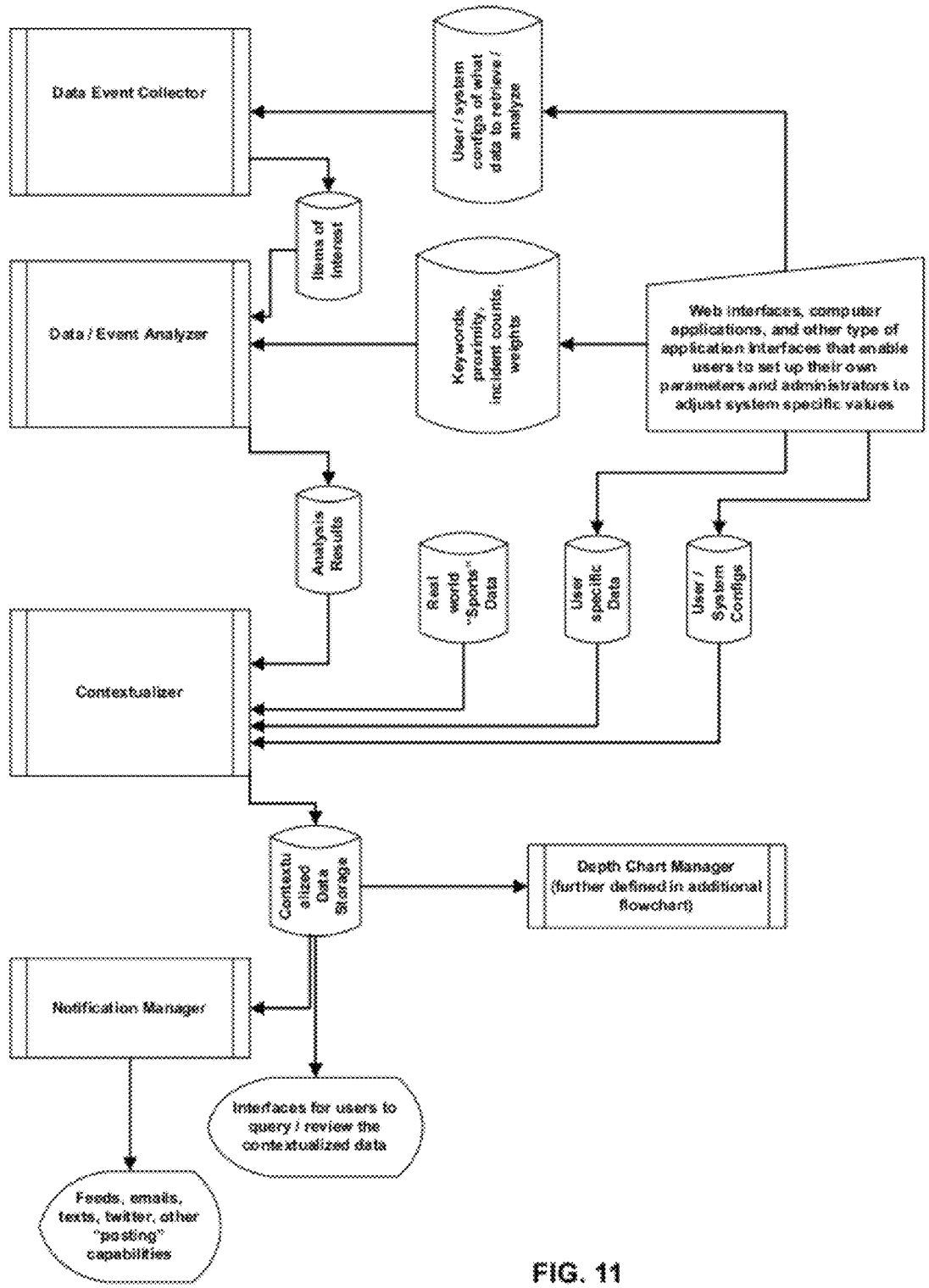
FIG. 11 is a flow chart depicting an overview of a contextual analyzer according to an embodiment of the present invention.

Referring now additionally to FIG. 11, a contextual analyzer, according to the present invention, is now described in greater detail. It is to be understood that the contextual analyzer may stand alone apart from the depth chart manager system, but also can be used in connection with the depth chart manager system, as indicated above. Data storage associated with the contextual analyzer can be databases, flat files, objects, etc. Those skilled in the art will appreciate that there are many ways to store data, and the means of storing data for this application can include any number of known data storage means.

The contextual analyzer illustratively includes a data event collector. The data event collector collects data and event information from various sources such as, for example, press conferences, news conferences (voice sources), videos, textural sources (blogs, Twitter, e-mail), as well as any number of other sources as may be understood by those skilled in the art. Since these sources can be both user-defined or system defaults, it is anticipated that information relating to these sources are stored on a predetermined storage location. The predetermined storage location may, for example, be an internal memory, a disk, "the cloud," or any number of other storage locations. For example, the system may not automatically choose to analyze the Dallas Morning News, but a user that resides in Dallas may place a high level of trust in such a publication and may set that publication to be one of the data elements to be retrieved and analyzed with respect to data to be collected by the data event collector.

It is thereafter determined if the information in the data event collector is an item of interest. If it is determined that the information in the data event collector is an item of interest, then the information is analyzed by a data/event analyzer. The contextual analyzer may include an information relevancy indicator which, for example, weighs key words that may be recognized in the data stored in the data event collector, and weigh those key words. The key words may, for example, include player names, proximity, incident, or any other various key words that may be desired to be analyzed when reviewing data. These key words may be weighted in order to determine whether or not data collected by the data event collector is an item of interest. After the data that is filtered into the data/event analyzer has been analyzed, analysis results are outputted.

The analysis results are used by the contextualizer to provide contextualized data. The contextualized data is stored in contextualized data storage. The contextualizer takes in data as well as other configurations, and creates a set of information that is placed into a context relating to the events of a particular user's actual fantasy needs. It is to be understood that a particular user may include the system itself, another software process, an agent, or anything else that looks to define a set of fantasy players that may know as much as there is to know about it, pre-filtered, analyzed, ranked, projected stats, etc. As indicated above, after the data is processed by the contextualizer, the contextualized data is stored in the contextualized data storage.

Thereafter, a notification manager may be used to provide a notification regarding the contextualized data. This may be provided via e-mails, texts, Twitter updates, or any other type of known notification mechanism. The notification manager may use any number of various settings to provide notifications. For example, the notification manager may check for new data stored in the contextualized data storage based on a predetermined timeframe, or may use push notifications to provide notifications based on the detection of new information in the contextualized data storage. Those skilled in the art will also appreciate that the contextualized data storage may include an interface so that users may query and review information stored in the contextualized data storage. Information stored in the contextualized data storage may be fed to the depth chart manager, as illustrated, for example, in FIG. 10.

Figure 12:
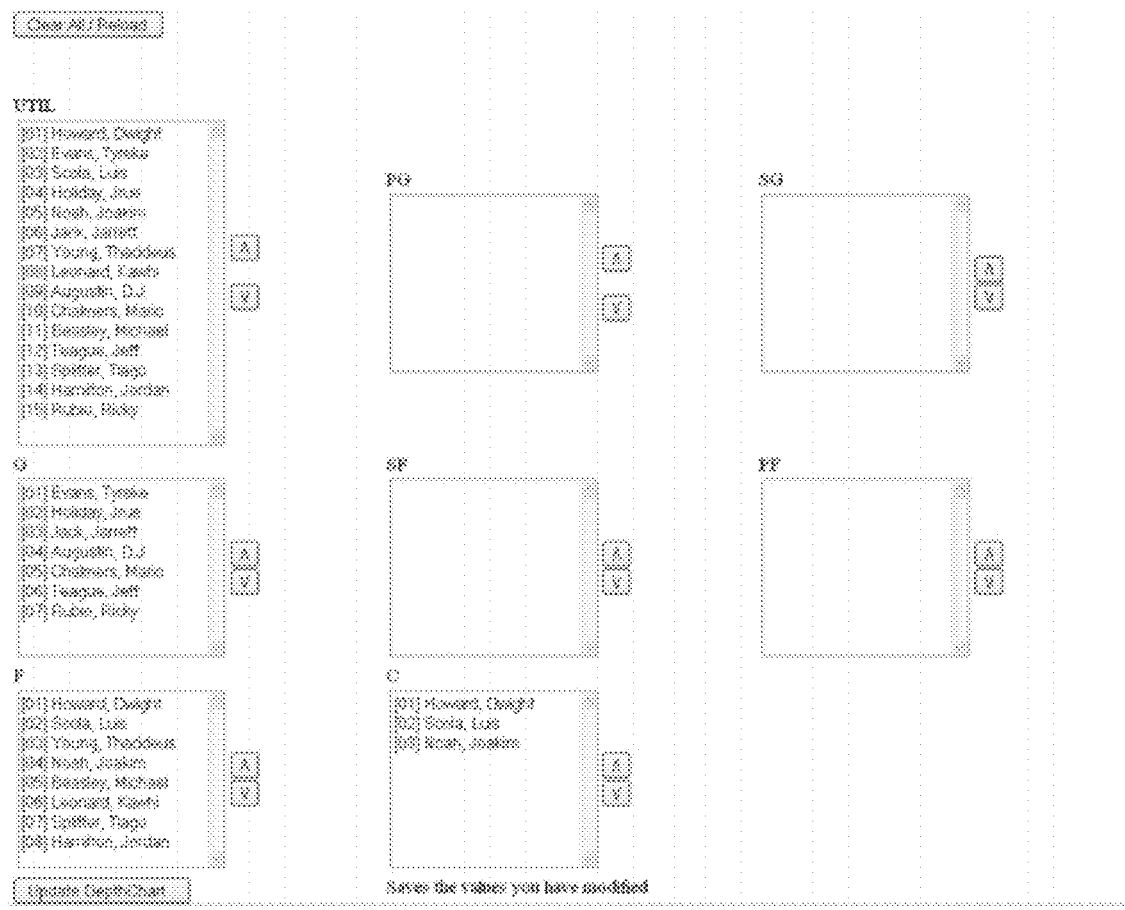
FIG. 12 is a screen shot depicting an automatic fantasy team depth chart according to an embodiment of the present invention.

Now referring to FIG. 12, a sample of a depth chart user interface is shown. The illustration is not meant to limit the interfaces described in this patent to only this specific example; rather it is intended to provide an example of such an interface. It is an extremely simple example of the depth chart interfaces and it should enable someone skilled in the art to quickly get an understanding of what will happen behind the scenes once the user is finished setting their depthchart through the provided screen and when the other systems discussed in the patent execute against this data.

The example interface of FIG. 12 is based on a fantasy basketball league, but any sport or event could be easily configured along the same lines using different positions relevant to those sports. Basketball positions are PG (point guard), SG (shooting guard), SF (small forward), PF (power forward), C (center) and sometimes certain positions are lumped into groups; PG and SG may be lumped into a single group called guards (G), SF and PF may be lumped into a single group called forwards (F). How positions are grouped in fantasy leagues is simply a game variable. In the case of the example in FIG. 12 the league that this team is a member is set up so that the two guard types are in a single group (G), the forwards are in a single group (F), and the centers in their own group (G). It is also common in fantasy sports to allow users to set anybody they want to in certain lineup spots. These types of spots are referred to as utility spots and are in the case of this diagram referred to using the abbreviation UTIL. Typically, all players on a fantasy team qualify as UTIL.

All of the fantasy team's players are listed under each of the lineup positions for which the player is eligible. So, since all players can play the UTIL position, then in the illustration the entire roster of the fantasy team is listed within the UTIL position ranking area. Likewise, any players that are eligible to play in the forward position are listed within the F position ranking area and those that have guard eligibility are in the guard position ranking area. In this example, the fantasy league commissioner has chosen settings such that the only positions are G, F, C, UTIL. For that reason, the user is not presented with options to rank their PG in the PG area. All of the PGs are in the G area only. For the same reason the user is not presented with options to rank their SGs, SFs, or PFs. Each player who is eligible at one of those specific positions is also automatically eligible at the appropriate broader position as mentioned above and they need only be ranked there for this particular fantasy league.

The user can alter the rankings of the players in each position ranking area by selecting the players they want to re-rank and clicking the up and down arrows so that the players that they prefer to be in their lineups at each position are higher ranked. The user can then save their rankings when they are satisfied and the system will remember these rankings and then utilize them when reviewing/setting the lineup through systems and methods previously discussed.

It is worth mentioning that this same screen, or a similar one, can be used to simply view the current depth chart settings for a given fantasy team. It is also worth mentioning that for those skilled in the art there are multitudes of different ways to give users the same type of configuration options (among many others previously discussed) and that the example in FIG. 12 is simply one of those ways and is shown this particular way for illustration and discussion purposes only.

While the present invention has been described above in terms of specific embodiments, it is to be understood that the invention is not limited to these disclosed embodiments. Many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

What is claimed is:

1. A computer program product comprising:
   a non-transitory computer readable memory medium; and
   computer controlling instructions stored on the non-transitory computer readable memory medium to control management of one or more fantasy teams, wherein each of the one or more fantasy teams includes fantasy team members on a fantasy team roster, and wherein the computer controlling instructions include:
   establishing rules defining an optimal starting lineup for the one or more fantasy teams;
   collecting data related to at least one member of the one or more fantasy teams;
   storing the data collected on the computer readable memory medium;
   analyzing the data collected according to the rules;
   determining whether there is a discrepancy between a current starting lineup of the one or more fantasy teams and the optimal starting lineup for the one or more fantasy teams;
   recommending at least one change to the current starting lineup of the one or more fantasy teams if a discrepancy is discovered; and
   notifying a user of any discrepancy discovered and of any change recommended to define a recommended change,
   wherein analyzing the data comprises filtering the data to identify key terms, associating a relative value to each key term identified, enhancing the relative value of key terms appearing in close proximity to one another, enhancing the relative value of key terms appearing in a particular source, enhancing the relative value of key terms sharing a common source, enhancing the relative value of key terms appearing more frequently, and generating a recommendation based on the enhanced relative value of key terms to indicate a probability that a member of the one or more fantasy teams will actually compete.

2. The computer program product of claim 1 wherein the rules are selected from at least one of the group consisting of system-supplied default settings and user-supplied custom settings.

3. The computer program product of claim 1 wherein the optimal starting lineup is defined as at least one of filling every spot on the current starting lineup, filling each spot on the current starting lineup with the fantasy team member from the fantasy team roster that is most suited for that spot, and filling each spot on the current starting lineup with the fantasy team member from the fantasy team roster that is least suited for that spot.

4. The computer program product of claim 1 wherein the data is collected from at least one of the group consisting of expert projections, news reports, blog postings, social network postings, injury reports, league data, league announcements, team data, team announcements, statistical data, user-supplied input and press conferences.

5. The computer program product of claim 1 wherein the data collected is selected from at least one of the group consisting of data related to all members of a fantasy team league, data related to all members of a fantasy team database, data related to all members of the fantasy team league that compete on a given day, data related to all members of the fantasy team league that are eligible to compete, data related to all members of the fantasy team league on any fantasy team roster, data related to all members of the fantasy team league on a particular fantasy team roster, and data related to all members of the one or more fantasy teams on a starting lineup.

6. The computer program product of claim 1 wherein the computer controlling instructions further comprises notifying the user of data relevant to at least one member of the one or more fantasy teams, generating a report of data relevant to at least one member of the one or more fantasy teams and sending the report to the user.

7. The computer program product of claim 1 wherein analyzing the data comprises filtering the data to identify key terms, associating a relative value to each key term identified, enhancing the relative value of key terms appearing in close proximity to one another, enhancing the relative value of key terms appearing in a particular source, enhancing the relative value of key terms appearing more frequently, and generating a recommendation based on a projected scoring output of a member of the one or more fantasy teams.

8. The computer program product of claim 1 wherein the discrepancy is defined as the optimal starting lineup and the current starting lineup listing a different member of the one or more fantasy teams for a position.

9. The computer program product of claim 1 wherein, if any discrepancy is discovered, the computer controlling instructions further comprises at least one of conforming the current starting lineup to the optimal starting lineup upon receiving authorization from the user to implement the recommended change and automatically implementing the recommended change to the current starting lineup.

10. The computer program product of claim 9 wherein automatic implementation of the recommended change to the current starting lineup occurs only if the user does not manually implement the change to the current starting lineup prior to at least one of the time intervals selected from the group consisting of before the start of a next competition in which any member of the current starting lineup is eligible to compete, before the start of a next competition in which any member of a fantasy team roster will be eligible to compete, and before the start of a next competition in which any member of an opposing fantasy team is eligible to compete.

11. The computer program product of claim 1 wherein the data collected is utilized to automatically compute at least one of a recommended depth chart for the team members of the one or more fantasy teams, and the optimal starting lineup, wherein the optimal starting lineup is defined as those members of the one or more fantasy teams to be started that are most likely to lead to maximum points scored for the one or more fantasy teams.

12. The computer program product of claim 1 wherein notifying the user is defined as at least one of outputting a list via display or report, outputting a table via display or report, outputting a chart via display or report, e-mailing a notification to the user, texting a notification to the user, sending a notification to the user as a social network update, or sending a push notification to the user via an application.

13. The computer program product of claim 1 wherein the computer controlling instructions further comprises setting preferences to enable or disable automatic implementation of the recommended change.

14. A method of managing one or more fantasy teams utilizing a computer program product comprising a non-transitory computer readable memory medium and computer controlling instructions stored on the non-transitory computer readable memory medium to control management of the one or more fantasy teams, wherein each of the one or more fantasy teams includes fantasy team members, the method including:
   establishing rules defining an optimal starting lineup for the one or more fantasy teams;
   collecting data related to at least one member of the one or more fantasy teams;
   analyzing the data collected according to the rules;
   determining whether there is a discrepancy between a current starting lineup of the one or more fantasy teams and the optimal starting lineup for the one or more fantasy teams;
   recommending at least one change to the current starting lineup of the one or more fantasy teams if a discrepancy is discovered; and
   notifying a user of any discrepancy discovered and of any change recommended to define a recommended change;
   wherein notifying the user is defined as at least one of outputting a list via display or report, outputting a table via display or report, outputting a chart via display or report, e-mailing a notification to the user, texting a notification to the user, sending a notification to the user as a social network update, or sending a push notification to the user via an application,
   wherein analyzing the data comprises filtering the data to identify key terms, associating a relative value to each key term identified, enhancing the relative value of key terms appearing in close proximity to one another, enhancing the relative value of key terms appearing in a particular source, enhancing the relative value of key terms appearing more frequently, and generating the recommended change, wherein the recommended change is based on at least one of a projected scoring output of a member of the one or more fantasy teams and a probability that a member of the one or more fantasy teams will actually compete based on the enhanced relative value of key terms.

15. The method of claim 14 further comprising setting preferences to enable or disable automatic implementation of the recommended change.

16. The method of claim 14 further comprising ranking members of the one or more fantasy teams according to their performance in a particular role for a particular period of time, to define an automatic fantasy team depth chart.

17. The method of claim 16 further comprising setting preferences to enable or disable automatic implementation of the automatic fantasy team depth chart.

18. The method of claim 14 wherein automatic implementation of the recommended change to the current starting lineup occurs only if the user does not manually implement the change to the current starting lineup prior to at least one of the time intervals selected from the group consisting of before the start of a next competition in which any member of the current starting lineup is eligible to compete, before the start of a next competition in which any member of a fantasy team roster will be eligible to compete, and before the start of a next competition in which any member of an opposing fantasy team is eligible to compete.

19. The method of claim 14 further comprising, if any discrepancy is discovered, at least one of conforming the current starting lineup to the optimal starting lineup upon receiving authorization from the user to implement the recommended change and automatically implementing the recommended change to the current starting lineup, wherein the discrepancy is defined as the optimal starting lineup and the current starting lineup listing a different member of the one or more fantasy teams for a position.

20. The method of claim 14 wherein the optimal starting lineup is defined as at least one of filling every spot on the current starting lineup, filling each spot on the current starting lineup with the fantasy team member from the fantasy team roster that is most suited for that spot, and filling each spot on the current starting lineup with the fantasy team member from the fantasy team roster that is least suited for that spot.

21. A method of managing one or more fantasy teams utilizing a computer program product comprising a non-transitory computer readable memory medium and computer controlling instructions stored on the non-transitory computer readable memory medium to control management of the one or more fantasy teams, wherein each of the one or more fantasy teams includes fantasy team members, the method including:
    establishing rules defining an optimal roster for the one or more fantasy teams;
    collecting data related to at least one member of the one or more fantasy teams;
    analyzing the data collected according to the rules;
    determining whether there is a discrepancy between a current roster of the one or more fantasy teams and the optimal roster for the one or more fantasy teams;
    recommending at least one change to the current roster of the one or more fantasy teams if a discrepancy is discovered; and
    notifying a user of any discrepancy discovered and of any change recommended to define a recommended change;
    wherein notifying the user is defined as at least one of outputting a list via display or report, outputting a table via display or report, outputting a chart via display or report, e-mailing a notification to the user, texting a notification to the user, sending a notification to the user as a social network update, or sending a push notification to the user via an application,
    wherein analyzing the data comprises filtering the data to identify key terms, associating a relative value to each key term identified, enhancing the relative value of key terms appearing in close proximity to one another, enhancing the relative value of key terms appearing in a particular source, enhancing the relative value of key terms appearing more frequently, and generating the recommended change, wherein the recommended change is based on at least one of a projected scoring output of a member of the one or more fantasy teams and a probability that a member of the one or more fantasy teams will actually compete based on the enhanced relative value of key terms.

22. The method of claim 21 further comprising setting preferences to enable or disable automatic implementation of the recommended change.

23. The method of claim 21 further comprising ranking members of the one or more fantasy teams according to their performance in a particular role for a particular period of time, to define an automatic fantasy team depth chart.

24. The method of claim 23 further comprising setting preferences to enable or disable automatic implementation of the automatic fantasy team depth chart.

25. The method of claim 21 wherein automatic implementation of the recommended change to the current roster occurs only if the user does not manually implement the change to the current starting lineup prior to at least one of the time intervals selected from the group consisting of before the start of a next competition in which any member of the current roster is eligible to compete, before the start of a next competition in which any member of a fantasy team league will be eligible to compete, and before the start of a next competition in which any member of an opposing fantasy team is eligible to compete.

26. The method of claim 21 further comprising, if any discrepancy is discovered, at least one of conforming the current roster to the optimal roster upon receiving authorization from the user to implement the recommended change and automatically implementing the recommended change to the current roster, wherein the discrepancy is defined as the optimal roster and the current roster listing a different member of the one or more fantasy teams for a position.

27. The method of claim 21 wherein the optimal starting lineup is defined as at least one of filling every spot on the current starting lineup, filling each spot on the current starting lineup with the fantasy team member from the fantasy team roster that is most suited for that spot, and filling each spot on the current starting lineup with the fantasy team member from the fantasy team roster that is least suited for that spot.

* * * * *